(12) United States Patent
Yang

(10) Patent No.: US 12,253,957 B2
(45) Date of Patent: Mar. 18, 2025

(54) METHOD OF HANDLING TRIM COMMAND IN FLASH MEMORY AND RELATED MEMORY CONTROLLER AND STORAGE SYSTEM THEREOF

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

(*) Notice: Subject to any disclaimer, the term of this patent is extended or adjusted under 35 U.S.C. 154(b) by 183 days.

(21) Appl. No.: 18/102,779

(22) Filed: Jan. 30, 2023

(65) Prior Publication Data

US 2024/0256465 A1 Aug. 1, 2024

(51) Int. Cl.
*G06F 12/12* (2016.01)
*G06F 12/1009* (2016.01)

(52) U.S. Cl.
CPC .......... *G06F 12/12* (2013.01); *G06F 12/1009* (2013.01)

(58) Field of Classification Search
CPC .. G06F 12/12; G06F 12/1009; G06F 12/0246; G06F 2212/7201; G06F 2212/7205; G06F 12/063; G06F 9/3004
See application file for complete search history.

(56) References Cited

U.S. PATENT DOCUMENTS

| 11,416,154 B2 | 8/2022 | Parthasarathy | |
| 2020/0026436 A1* | 1/2020 | Ou | G06F 3/0611 |
| 2020/0167235 A1* | 5/2020 | Chai | G06F 11/1469 |
| 2021/0303212 A1* | 9/2021 | Chen | G06F 3/064 |
| 2022/0004332 A1* | 1/2022 | Kang | G06F 3/0655 |

FOREIGN PATENT DOCUMENTS

| TW | 201828067 A | 8/2018 |
| TW | 201905700 A | 2/2019 |
| TW | 202013183 A | 4/2020 |
| TW | 202026887 A | 7/2020 |
| TW | 202121176 A | 6/2021 |

* cited by examiner

Primary Examiner — Hiep T Nguyen
(74) Attorney, Agent, or Firm — Winston Hsu

(57) ABSTRACT

A method of handling trim commands in a flash memory is provided. The method comprises: receiving a trim command; modifying logical-to-physical (L2P) address mapping entries of a L2P address mapping table according to the trim command; and storing trim information of the trim command into one of data blocks of the flash memory after modifying the L2P address mapping entries according to the trim command.

14 Claims, 6 Drawing Sheets

Trim CMD

| Start LBA | Trim Length |
|---|---|
| 200 | 2 |
| 300 | 1 |
| 400 | 1 |

L2P Address Mapping Table

| LBA | Physical Block Addr | Physical Page Addr |
|---|---|---|
| 0 | 7 | 555 |
| ... | ... | ... |
| 200 | 5 | 99 |
| 201 | 5 | 100 |
| ... | ... | ... |
| 300 | 23 | 51 |
| ... | ... | ... |
| 400 | 11 | 36 |
| ... | ... | ... |

Valid Page (LBA) Count Table

| Physical Block Addr | Valid Page Count |
|---|---|
| 0 | 150 |
| 1 | 700 |
| ... | ... |
| 5 | 10 |
| ... | ... |
| 11 | 200 |
| ... | ... |
| 23 | 500 |
| ... | ... |

FIG. 2

METHOD OF HANDLING TRIM COMMAND IN FLASH MEMORY AND RELATED MEMORY CONTROLLER AND STORAGE SYSTEM THEREOF

BACKGROUND OF THE INVENTION

1. Field of the Invention

The present invention relates to flash memory, and more particularly, to a method of handling trim commands in a flash memory and related memory controller and storage system thereof.

2. Description of the Prior Art

Due to the nature of flash memory, the flash memory does not support overwrite operations. When new data needs to replace older data already stored in the flash memory, the new data will be written to a new location and the data in the old location becomes invalid. The amount of invalid data will increase as overwriting of older data has been repeated. To ensure enough amount of the storage area in which data can be stored, the flash memory controller performs a garbage collection (GC) operation to free space occupied by the invalid data. Typically, the GC operation moves valid data from pages of a source block to a new spare block and then erases the source block for re-use. On the other hand, a trim command allows an operating system to tell a flash memory controller that data on certain pages are no longer in-use or outdated (i.e., invalid data) and therefore can be erased internally. In view of this, GC operation can skip such invalid data instead of retaining it. Thus, the trim command allows the flash memory controller to recognize invalid data much sooner, reducing the burden on the GC operation.

Typically, when receiving the trim command, the flash memory controller would modify a logical-to-physical (L2P) address mapping table to reflect data of which pages become invalid. Such table is permanently stored in the flash memory. When being used, it will be loaded to and modified on a volatile memory of the flash memory controller for enhancing efficiency of address translation. To maintain consistency, the flash memory controller needs to regularly perform a process for updating the L2P address mapping to replace an older version of the L2P address mapping table in the flash memory with a newer version of the L2P address mapping table in the volatile memory of the memory controller.

The process for updating the L2P address mapping table would be triggered by the trim command since the trim command could cause changes to the L2P address mapping table. However, the process for updating the L2P address mapping table must deal with changes to the L2P address mapping table that are caused by the trim command as well as changes to the L2P address mapping table that are caused by normal write operations. Otherwise, there will be conflict in a power-on data rebuild process later on. In view of this, it becomes very time-consuming to deal with the trim command, which may leads to a significant latency. In view of this, there is a need to provide an innovative mechanism for handling trim commands.

SUMMARY OF THE INVENTION

In view of above, it is one object of the present invention to provide a method for use in a flash memory to deal with a trim command. In embodiments of the present invention, information regarding the trim command will be saved to the flash memory after logical-to-physical (L2P) address mapping entries has been modified according to the trim command. Instead of storing the modified L2P address mapping entries that caused by the trim command and normal write operation to the flash memory, the present invention only stores trim information regarding start logical block address and trim length of each the trim command. In view of this, the present invention significantly improves the efficiency of handling trim commands.

According to one embodiment, a method of handling trim commands in a flash memory is provided. The method comprises: receiving a trim command; modifying logical-to-physical (L2P) address mapping entries of a L2P address mapping table according to the trim command; and storing trim information of the trim command into one of data blocks of the flash memory after modifying the L2P address mapping entries according to the trim command.

According to one embodiment, a memory controller for use in a flash memory to control the flash memory and handle trim commands in the flash memory is provided. The memory controller comprises: a storage unit arranged to store information and program codes; and a processing unit operable to execute the program codes. The processing unit is arranged to: receiving a trim command; modifying logical-to-physical (L2P) address mapping entries of a L2P address mapping table according to the trim command; and storing trim information of the trim command into one of data blocks of the flash memory after modifying the L2P address mapping entries according to the trim command.

According to one embodiment, a storage system is provided. The storage system comprises: a flash memory; and a memory controller. The memory controller is for use to control the flash memory and handle trim commands in the flash memory. The memory controller is configured to receive a trim command; modify logical-to-physical (L2P) address mapping entries of a L2P address mapping table according to the trim command; and store trim information of the trim command into one of data blocks of the flash memory after modifying the L2P address mapping entries according to the trim command.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates a trim command, an L2P address mapping table and a valid page count table according to one embodiment of the present invention.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
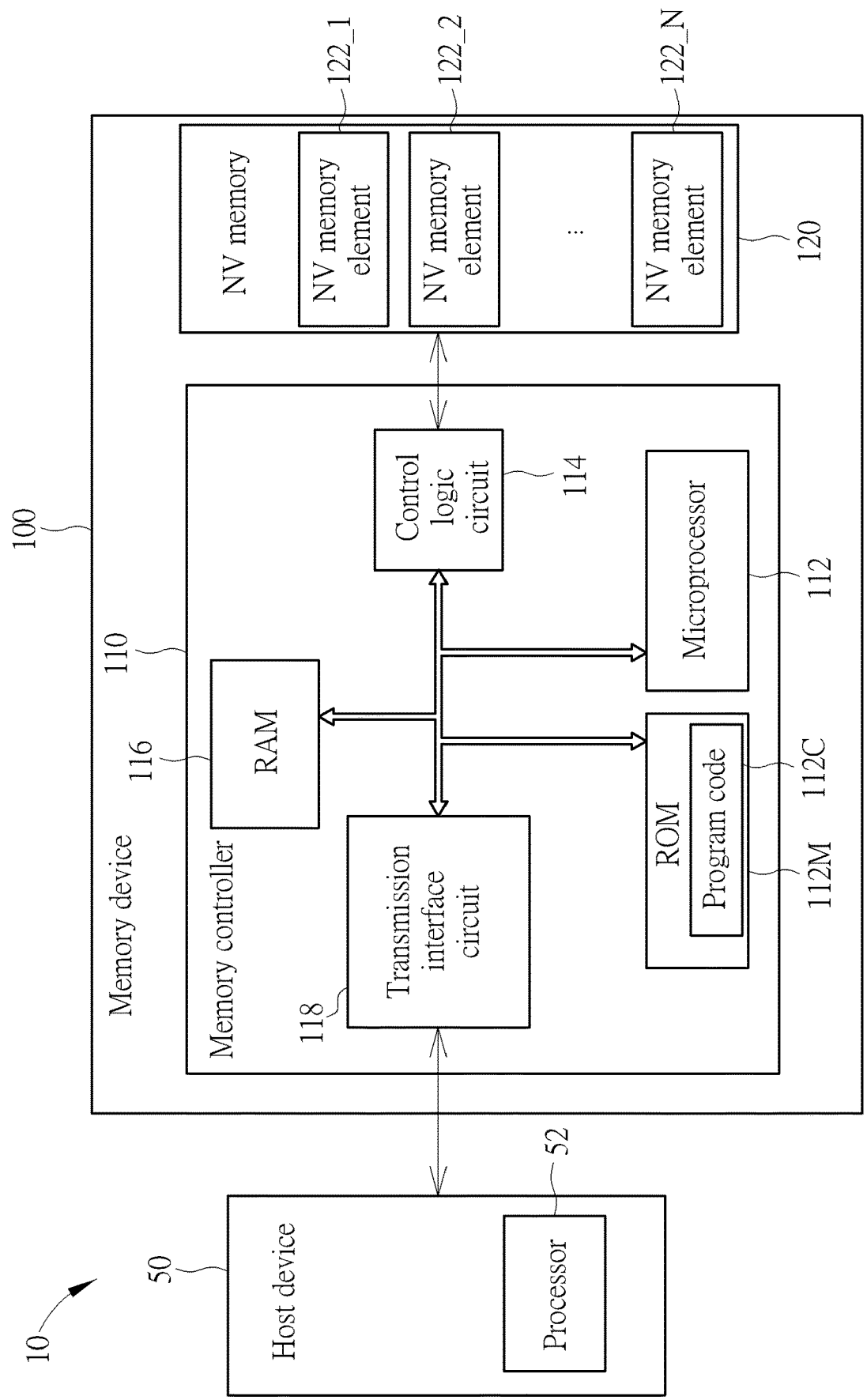
FIG. 1 illustrates a schematic diagram of a storage device according to one embodiment of the present invention.

FIG. 1 is a diagram illustrating an electronic device 10 according to an embodiment of the present invention, where the electronic device 10 comprises a host device 50 and a memory device 100. The host device 50 may comprise: at least one processor 52 configured to control operations of the host device 50. Examples of the host device 50 may include, but are not limited to: a smartphone, a tablet computer, a wearable device, a personal computer such as a desktop computer and a laptop computer, an imaging device such as a digital still camera or a video camera a game console, a car navigation system, a printer, a scanner or a server system. Examples of the memory device 100 may include, but are not limited to: a portable memory device (such as a memory card conforming to SD/MMC, CF, MS, XD or UFS specifications), a solid state drive (SSD) and various embedded storage device (such as an embedded storage device conforming to UFS or EMMC specifications).

According to various embodiments, the memory device 100 may comprise a controller such as a memory controller 110, and may further comprise a non-volatile (NV) memory 120. The NV memory 120 is configured to store information. The NV memory 120 may comprise at least one NV memory element (e.g. one or more NV memory elements), such as a plurality of NV memory elements 122_1-122_N. For example, the NV memory 120 may be a flash memory, and the NV memory elements 122_1-122_N may be a plurality of flash memory chips or a plurality of flash memory dies, respectively, but the present invention is not limited thereto. In addition, the NV memory 120 may comprise memory cells having a two-dimensional structure or may comprise memory cells having a three-dimensional structure.

As shown in FIG. 1, the memory controller 110 may comprise a processing circuit such as a microprocessor 112, a storage component such as a read-only memory (ROM) 112M, a control logic circuit 114, a random access memory (RAN) 116, and a transmission interface circuit 118, where at least one portion (e.g. a portion or all) of these components may be coupled to one another through a bus. The RAM 116 may be a static RAM (SRAM) or a dynamic RAM (DRAM), which is configured to provide internal storage space for the memory controller 110, for example, temporarily storing information, such as variables, data, commands, addresses and/or address mapping tables. Moreover, the RAM 116 may be provided by allocating a part of a system memory (not shown) of the host device 50. In addition, the ROM 112M of this embodiment is configured to store a program code 112C, and the microprocessor 112 is configured to execute the program code 112C to control access of the NV memory 120. Alternatively, the program code 112C may be stored in the NV memory 120.

The memory controller 110 controls reading, writing and erasing of the NV memory 120 through a control logic circuit 114. In addition, the memory controller 110 could perform writing of user data based on host commands from the host device 50 and writing of valid data which is read from the NV memory 120 by the garbage collection and or wear-leveling concurrently. The control logic circuit 114 may be further configured to control the NV memory 120 and comprise an Error Correction Code (ECC) circuit (not shown), to perform data protection and/or error correction, but the present invention is not limited thereto. The transmission interface circuit 118 may conform to a specific communications specification (such as Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification) and may perform communications with the host 50 according to the specific communications specification.

Typically, the host device 50 may access the memory device 100, indirectly, through transmitting host commands and corresponding logic addresses to the memory controller 110. The memory controller 110 receives the host commands and the logic addresses, and translates the host commands to memory operation commands, and further controls the NV memory 120 with the memory operation commands to perform read, write or erase operations upon memory units or data pages having physical addresses within the NV memory 120, where the physical addresses corresponds to the logic addresses. When the memory controller 110 performs an erase operation on any NV memory element 122_k within the plurality of NV memory elements 122_1-122_N, at least one block of the NV memory element 122_k may be erased. In addition, each block of the NV memory element 122_k may comprise multiple pages, and an access operation (e.g. read or write) may be performed on one or more pages.

In one embodiment, each one of NV memory elements 122_1-122_N could be a NV memory die (or chip). There is control circuitry on each one of NV memory dies 122_1-122_N for executing memory operation commands issued by the memory controller 110. In addition, each of the NV memory dies 122_1-122_N could comprise a plurality of planes. Each plane may comprise a number of blocks of memory cells and associated row and column control circuitry. The memory cells in each plane may be arranged in a 2D or 3D memory structure. Multiple operations may be performed in parallel (i.e., simultaneously) on memory blocks of different planes according to a multi-plane (e.g. read, program, erase) operation. The multi-plane operation may perform various processing operations on different planes simultaneously.

In one embodiment, the memory controller 110 may be configured to group memory blocks of NV memory 120 into a plurality of super blocks. In one embodiment, the super block may be formed across a plurality of NV memory chips 122_1-122_K. The super block may be configured as one or more memory blocks included in each of the NV memory chips NV memory chip 122_1-122_K.

In one embodiment of the present invention, a logical-to-physical (L2P) address mapping table, which includes a plurality of L2P address mapping entries for performing logical to physical address translation, will be divided into multiple mapping groups, each includes a part of mapping entries of the L2P address mapping table. These mapping groups are permanently stored in the blocks of NV memory 120 and will be loaded to the RAM 116 when necessary. Similarly, a physical-to-logical (P2L) address mapping table, which includes a plurality of P2L address mapping entries for performing physical to logical address translation, will be divided into multiple mapping groups, each includes a part of mapping entries of the P2L address mapping table. These mapping groups are permanently stored in the blocks of NV memory 120 and will be loaded to the RAM 116 when necessary.

In one embodiment, the host device 50 may notify the memory controller 110 of one or more logical blocks that are no longer in-use or outdated (i.e., invalid data) and thus may be deleted by sending a trim command to the memory controller 110. Please refer to FIG. 2 for further understandings. As illustrated, a trim command typically includes one or more trim entries. That is, a first trim entry indicates a start logical block address (LBA) and a trim length of 2 (which means 2 mapping units needs to be trimmed, and each of the mapping unit could be preferably 4K bytes), which means data of two mapping units that starts from LBA 200 no longer in use by the host device 50. In addition, a second trim entry indicates a start LBA 300 and a trim length of 1, while a third trim entry indicates a start LBA 400 and a trim length of 1.

In this embodiment, a L2P address mapping table records mapping entries as follow: 1) LBA 0 is mapped to physical block address 7 and physical page address 555; 2) LBA 200 is mapped to physical block address 5 and physical page address 99; 3) LBA 201 is mapped to physical block address 5 and physical page address 100; 4) LBA 300 is mapped to physical block address 23 and physical page address 51; and 5) LBA 400 is mapped to physical block address 11 and physical page address 36. Moreover, a valid page count table records a number of valid pages (or valid LBA) included in physical blocks. For example, 150 valid pages (or 150 valid LBAs) in the physical block at physical block address 0; 700 valid pages (or 700 valid LBAs) in the physical block at physical block address 1; 10 valid pages (or 10 valid LBAs) in the physical block at physical block address 5; 200 valid pages (or 200 valid LBAs) in the physical block at physical block address 11; and 5) 500 valid pages (500 valid LBAs) in the physical block at block address 23.

Figure 3:
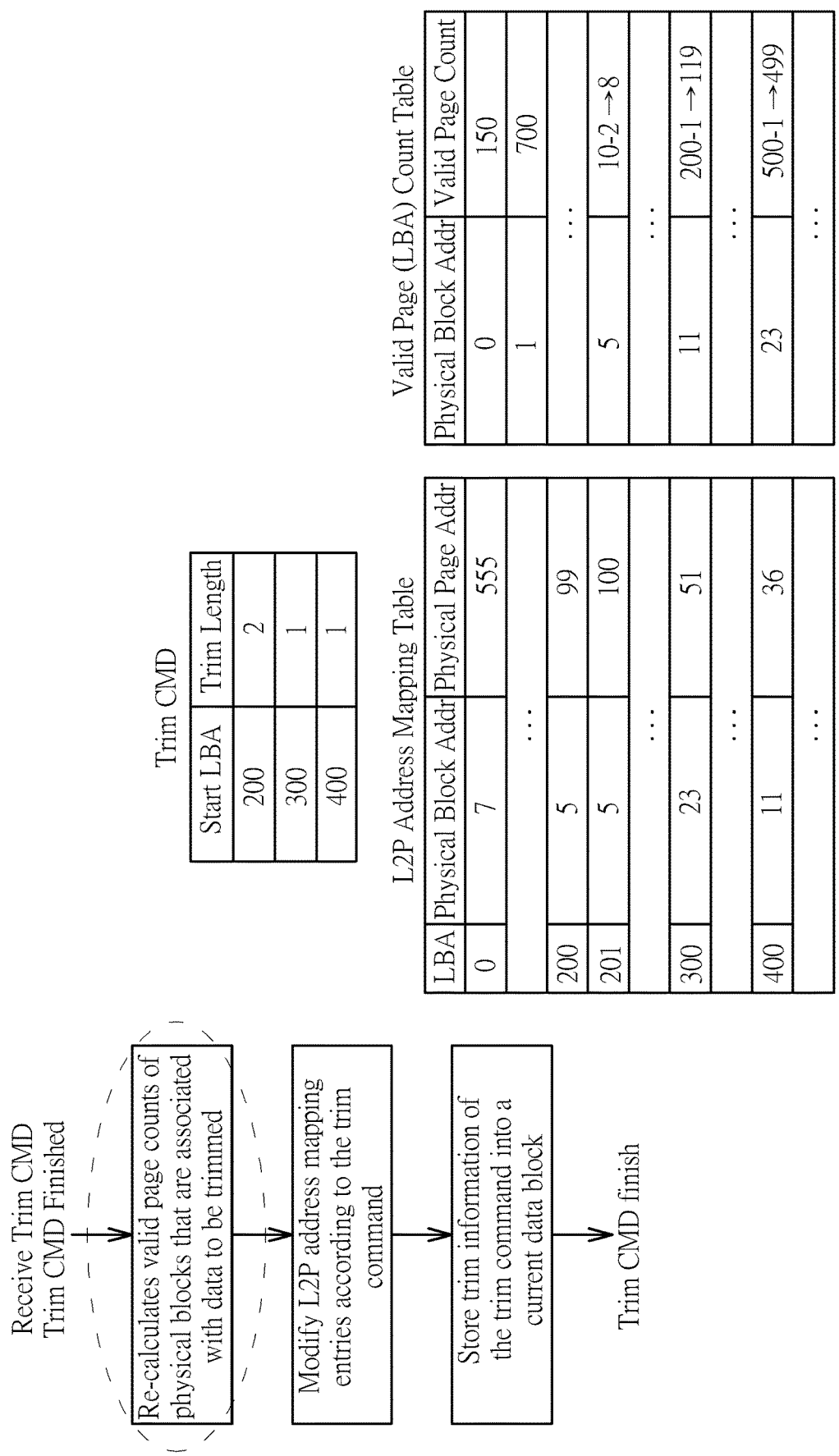
FIG. 3, FIG. 4 and FIG. 5 illustrates how to process a trim command according to one embodiment of the present invention.

Please refer to FIG. 3, which illustrates how the memory controller 110 handles a trim command at a first step of a handling flow according to one embodiment of the present invention. At first, the L2P address mapping table and the valid page count table would be loaded to the RAM 116 of the memory controller 110 from the NV memory 120 (if they have not been loaded before). Specifically, the memory controller 110 may not load the full L2P address mapping table and/or the full valid page count table to the RAM 116. Instead, the memory controller may only load a portion (e.g. one or several groups) of the full L2P address mapping table and/or a portion (e.g. one or several groups) of the full valid page count table to the RAM 116.

After that, the memory controller 110 firstly re-calculates valid page counts of physical blocks that are associated with data to be trimmed. As presented, a first trim entry is intended to trim data from LBA 200 with length of 2, a second trim entry is intended to trim data from LBA 300 with length of 1 and a third trim entry of the trim command is intended to trim data from LBA 400 with length of 1. Accordingly, the memory controller 110 would check the L2P address mapping table to map the LBAs to physical addresses of data that is intended to be trimmed. In accordance with the L2P address mapping table, LBA 200 is mapped to the physical block address 5 and physical page address 99, and LBA 201 is mapped to the physical block address 5 and physical page address 100. LBA 300 is mapped to the physical block address 23 and physical page address 51. LBA 400 is mapped physical block address 11 and physical page address 36.

Thus, the valid page count of the physical block at PBA 5 will be subtracted by according to data amount of data to be trimmed by the first trim entry, such that the valid page count (or the valid LBA count) of PBA 5 will become 8 (i.e., 10-2). The valid page count of the physical block at PBA 11 will be subtracted by data amount of data to be trimmed by the third trim entry, such that the valid page count (or the valid LBA count) of PBA 11 will become 199 (i.e., 200−1=199). The valid page count of the physical block at PBA 23 will be subtracted by the data amount of data to be trimmed by the second trim entry, such that the valid page count (or the valid LBA count) of PBA 23 will become 499 (i.e., 500−1=499).

Figure 4:
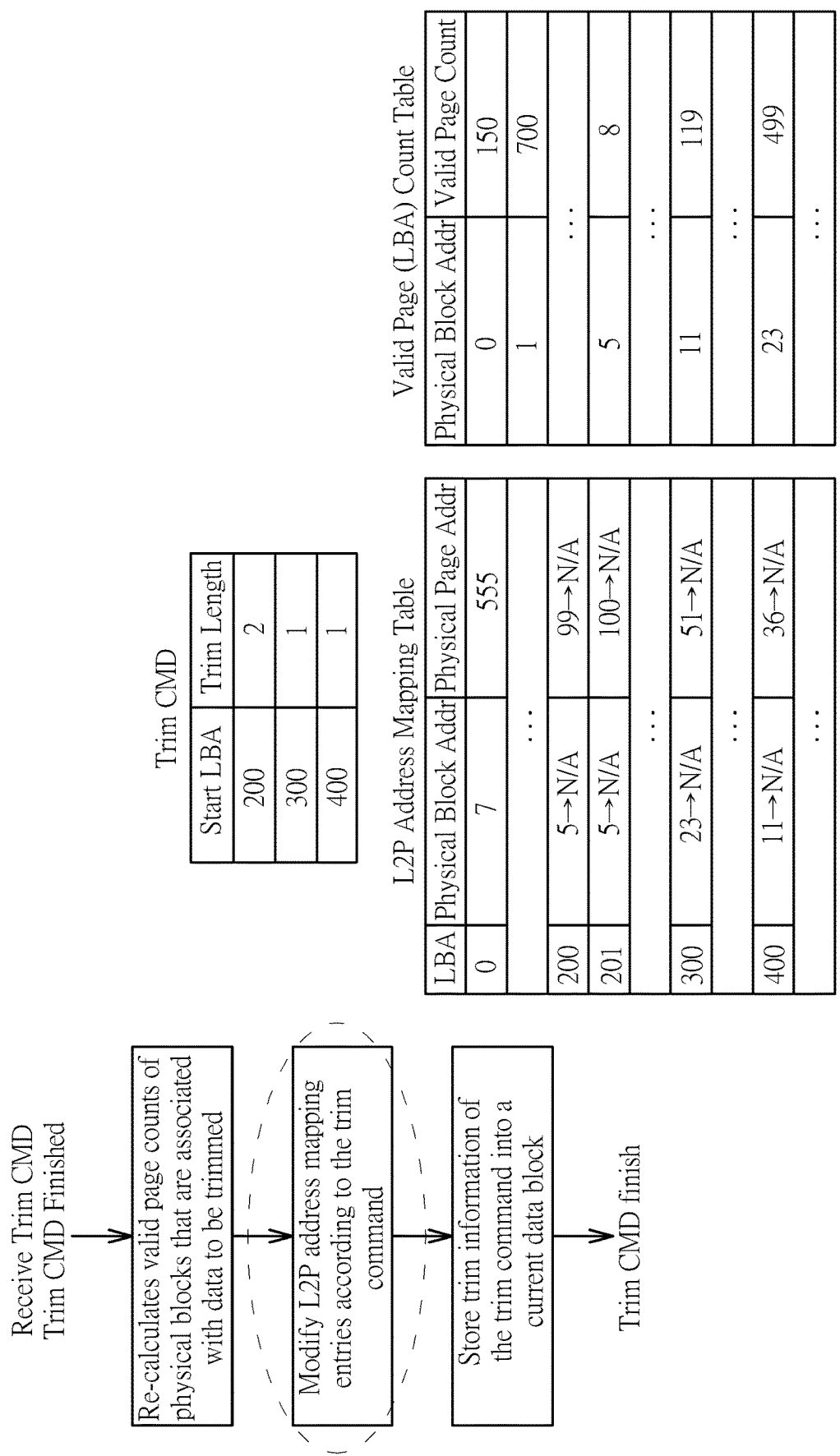

Please refer to FIG. 4, which illustrates how the memory controller 110 handles the trim command at a second step of the handling flow according to one embodiment of the present invention. At the second step shown by FIG. 4, the memory controller 110 would erase all L2P address mapping entries that are associated with trim ranges of the trim entries by modifying corresponding physical addresses as null value. Specially, a trim range of the first trim entry is two mapping units starting from LBA 200, and thus the L2P address mapping entries that are associated with LBA 200 (which map LBA 200 to physical block address 5 and page address 99) and LBA 201 (which maps LBA 201 to physical block address 5 and page address 100) will be erased from the L2P mapping table. A trim range of the second trim entry is one mapping unit starting from LBA 300 and thus the L2P address mapping entry that is associated with LBA 300 (which maps LBA 300 to physical block address 23 and page address 51) will be erased from the L2P mapping table. A trim range of the third trim entry is one mapping unit starting from LBA 400 and thus the L2P address mapping entry that is associated with LBA 400 (which maps LBA 400 to physical block address 11 and page address 36) will be erased from the L2P mapping table.

Figure 5:
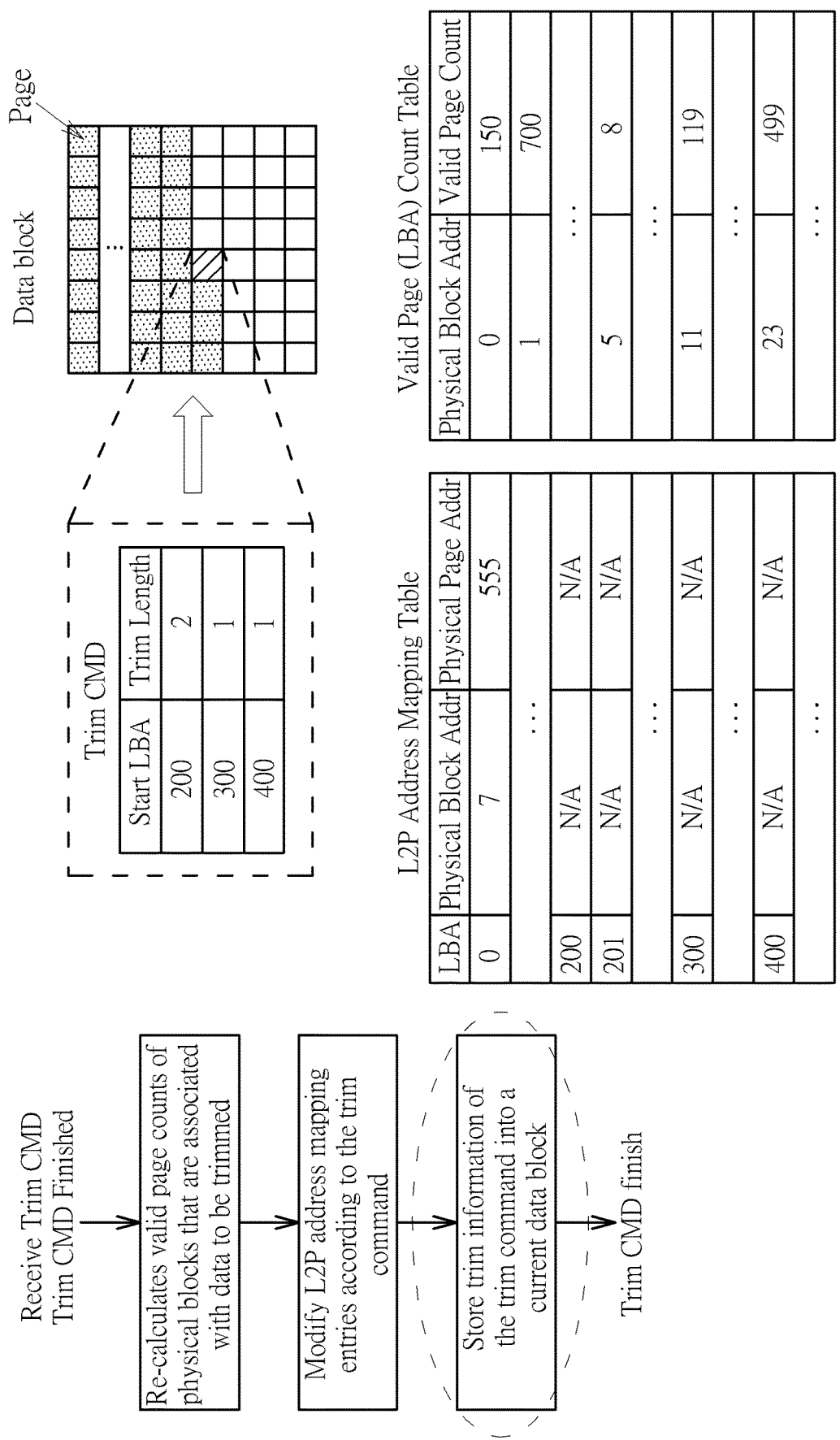

Please refer to FIG. 5, which illustrates how the memory controller 110 handles a trim command at a third step of the handling flow according to one embodiment of the present invention. At the third step shown by FIG. 5, the memory controller 110 would store trim information regarding the trim command into a current data block of the NV memory 120 that the memory controller 110 is currently using for writing (user) data to. Specifically, trim information regards start LBAs and trim lengths (or trim ranges) of all the trim entries contained in the trim command will be saved to a blank page of the current data block. Moreover, blocks of the NV memory 120 comprises data blocks and log blocks, and the trim information will be written into one of the data blocks (; preferably the data block that the memory controller is currently using for writing data to).

In one embodiment, the memory controller 110 would start sudden power off and recover (SPOR) after a power cycle (e.g. power off (by shutdown or power-interrupting event) and then power on) of the storage device 100. Specifically, the memory controller 110 would perform a power-on data rebuild process in response to SPOR. During the power-on data rebuild process, the memory controller 110 would load the saved trim information from the data block of the NV memory 120. Accordingly, the memory controller 110 would executes operations as mentioned in steps of FIG. 3, FIG. 4 and FIG. 5 again since data to be trimmed may be recovered in the power-on data rebuild process. In one embodiment, the memory controller 110 will redo the trim command and rebuild other user data in an order in which data is written to pages of the data block. By redoing the trim command according to the stored trim information in the power-on data rebuild process, it can be guaranteed that the validity of data can be recovered to the newest state (e.g., guarantying that data intended to be trimmed by the host device 50 is exactly trimmed) even if unintentional power off event occurs.

In one embodiment, a data block that the trim information is saved cannot be selected as a source block of a GC operation if all the address mapping information regarding the data block that the trim information is stored has not been saved to the NV memory 120 (e.g. saved to one of log blocks). In other words, the data block that the trim information is stored can be selected as a source block of the GC operation if all the address mapping information regarding the data block that the trim information is stored has been saved to the NV memory 120. Moreover, if the data block that the trim information is stored is selected as the source block of the GC operation, the trim information will be regarded as invalid data.

Figure 6:
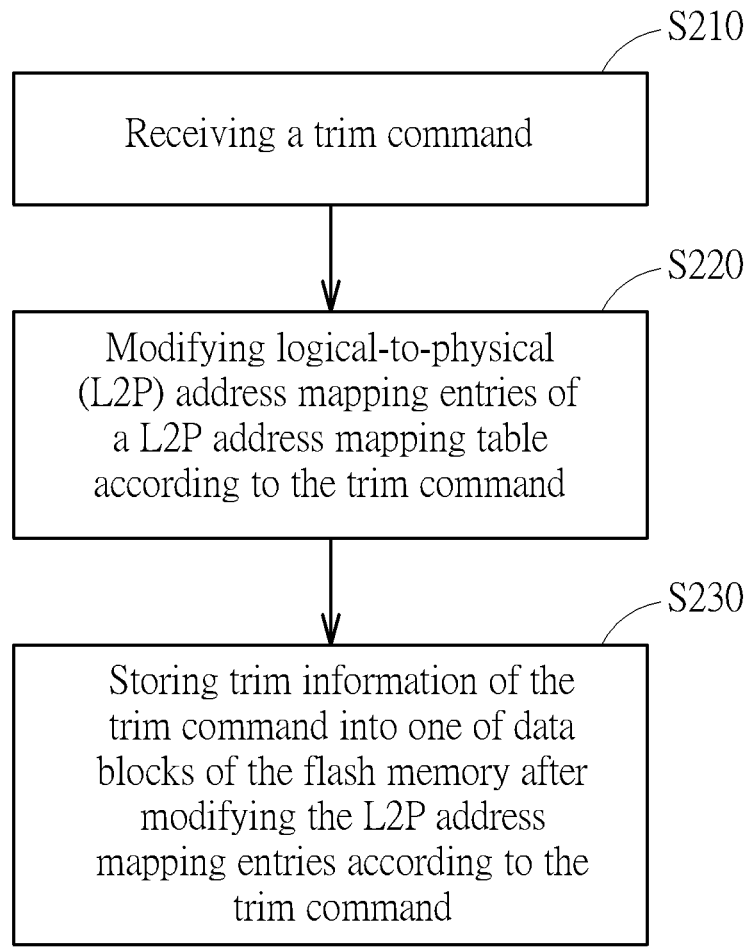
FIG. 6 illustrates a schematic diagram of a method of handling trim commands according to one embodiment of the present invention.

FIG. 6 illustrates a method of handling trim commands for a flash memory. As shown in the figure, the method of the present invention includes the following simplified flow:

Step S210: receiving a trim command;

Step S220: modifying logical-to-physical (L2P) address mapping entries of a L2P address mapping table according to the trim command; and Step S230: storing trim information of the trim command into one of data blocks of the flash memory after modifying the L2P address mapping entries according to the trim command.

Since principles and specific details of the foregoing steps have been explained in detail through the above embodiments, further descriptions will not be repeated here. It should be noted that the above flow may be possible, by adding other extra steps or making appropriate modifications and adjustments, to better improve flexibility and further improve efficiency of handling trim commands. Furthermore, all the operations set forth in the above embodiments can be implemented by the memory controller 110 shown in FIG. 1.

In conclusion, the method and the mechanism provided by the present invention can effectively complete trim commands that are associated with writing dummy patterns to the flash memory. Also, method and the mechanism provided by the present invention life by avoiding writing dummy patterns to the flash memory.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling trim commands in a flash memory, comprising:
    receiving a trim command;
    modifying logical-to-physical (L2P) address mapping entries of a L2P address mapping table according to the trim command;
    storing trim information of the trim command into one of data blocks of the flash memory without saving the modified L2P address mapping entries to the flash memory after modifying the L2P address mapping entries according to the trim command; and
    returning a finish notification to a host device which issues the trim command after storing the trim information into the flash memory.

2. The method of claim 1, further comprising:
    loading the trim information from the flash memory in response to an unintentional power off event; and
    modifying L2P address mapping entries of the L2P address mapping table according to the loaded trim information.

3. The method of claim 1, further comprising:
    re-calculating a valid page count of at least one physical block according to the trim command.

4. The method of claim 1, wherein the step of modifying the L2P address mapping table according to the trim command comprises:
    determining a trim range according to a start logical block address and a trim length of at least one trim entry included the trim command; and
    modify at least one L2P address mapping entry of the L2P address mapping table if the at least one L2P address mapping entry corresponds to a logical block address within the trim range.

5. The method of claim 1, wherein the trim information includes a start logical block address and a trim length of each trim entry of the trim command.

6. A memory controller for use in a flash memory to control the flash memory and handle trim commands in the flash memory, comprising:
- a storage unit, arranged to store information and program codes;
- a processing unit, operable to execute the program codes to be arranged to:
  - receive a trim command;
  - modify logical-to-physical (L2P) address mapping entries of a L2P address mapping table according to the trim command;
  - store trim information of the trim command into one of data blocks of the flash memory without saving the modified L2P address mapping entries to the flash memory after modifying the L2P address mapping entries according to the trim command; and
  - return a finish notification to a host device which issues the trim command after storing the trim information into the flash memory.

7. The memory controller of claim 6, wherein the processing unit is arranged to:
- load the trim information from the flash memory in response to an unintentional power off event; and
- modify L2P address mapping entries of the L2P address mapping table according to the loaded trim information.

8. The memory controller of claim 6, wherein the processing unit is arranged to:
- re-calculate a valid page count of at least one physical block according to the trim command.

9. The memory controller of claim 6, wherein the processing unit is arranged to:
- determine a trim range according to a start logical block address and a trim length of at least one trim entry included the trim command; and
- modify at least one L2P address mapping entry of the L2P address mapping table if the at least one L2P address mapping entry correspond to a logical block address within the trim range.

10. The memory controller of claim 6, wherein the trim information includes a start logical block address and a trim length of each trim entry of the trim command.

11. A storage system comprising a flash memory and the memory controller of claim 6.

12. A method of handling trim commands in a flash memory, comprising:
- receiving a trim command;
- modifying logical-to-physical (L2P) address mapping entries of a L2P address mapping table according to the trim command; and
- storing trim information of the trim command into one of data blocks of the flash memory after modifying the L2P address mapping entries according to the trim command; and
- not selecting the data block that the trim information is stored to as a source block of a garbage collection operation before the modified L2P address mapping entries regarding the trim command have been saved to the flash memory.

13. A memory controller for use in a flash memory to control the flash memory and handle trim commands in the flash memory, comprising:
- a storage unit, arranged to store information and program codes;
- a processing unit, operable to execute the program codes to be arranged to:
  - receive a trim command;
  - modify logical-to-physical (L2P) address mapping entries of a L2P address mapping table according to the trim command;
  - store trim information of the trim command into one of data blocks of the flash memory after modifying the L2P address mapping entries according to the trim command; and
  - not to select the data block that the trim information is stored to as a source block of a garbage collection operation before the modified L2P address mapping entries regarding the trim command have been saved to the flash memory.

14. A storage system comprising a flash memory and the memory controller of claim 13.

* * * * *